(12) United States Patent
Alfermann

(10) Patent No.: US 9,866,053 B2
(45) Date of Patent: Jan. 9, 2018

(54) METHOD FOR COMPENSATING ALTERNATOR REGULATION TO CONTROL REMOTE BATTERY VOLTAGE UTILIZING ADAPTIVE VARIABLE

(71) Applicant: REMY TECHNOLOGIES, LLC, Pendleton, IN (US)

(72) Inventor: Timothy J. Alfermann, Carmel, IN (US)

(73) Assignee: BorgWarner Inc., Auburn Hills, MI (US)

( * ) Notice: Subject to any disclaimer, the term of this patent is extended or adjusted under 35 U.S.C. 154(b) by 274 days.

(21) Appl. No.: 14/864,755

(22) Filed: Sep. 24, 2015

(65) Prior Publication Data

US 2016/0094060 A1    Mar. 31, 2016

Related U.S. Application Data

(60) Provisional application No. 62/055,560, filed on Sep. 25, 2014.

(51) Int. Cl.
| | |
|---|---|
| *H02J 7/00* | (2006.01) |
| *H01M 10/44* | (2006.01) |
| *H01M 10/48* | (2006.01) |
| *H02J 7/14* | (2006.01) |
| *H02J 7/16* | (2006.01) |

(52) U.S. Cl.
CPC ............ *H02J 7/007* (2013.01); *H01M 10/44* (2013.01); *H01M 10/48* (2013.01); *H02J 7/14* (2013.01); *H02J 7/163* (2013.01)

(58) Field of Classification Search
CPC ...................................................... H02J 7/007
USPC ............................................................ 318/148
See application file for complete search history.

(56) References Cited

U.S. PATENT DOCUMENTS

| | | | |
|---|---|---|---|
| 7,777,461 B2 * | 8/2010 | Martin | ............... H02M 3/1584 323/272 |
| 2008/0084639 A1 | 4/2008 | Harmon et al. | |
| 2012/0013310 A1 | 1/2012 | Clark et al. | |
| 2013/0163287 A1 | 6/2013 | Pal et al. | |
| 2014/0225555 A1 | 8/2014 | Biggs | |

FOREIGN PATENT DOCUMENTS

EP          1401081 A2       3/2004

OTHER PUBLICATIONS

International Search Report and Written Opinion; PCT/US2015/052062; dated Jan. 6, 2016; 9 pages.

\* cited by examiner

*Primary Examiner* — David S Luo
(74) *Attorney, Agent, or Firm* — Bose McKinney & Evans LLP

(57) ABSTRACT

A method for compensating for alternator to battery voltage drop in charging systems lacking external remote sensing capabilities and utilizing serial communications. A controller utilizes an adaptive variable for determining an alternator output voltage setpoint that compensates for battery cable voltage losses, and adjusting the setpoint to achieve substantially constant battery voltage of the entire range of alternator loads.

20 Claims, 3 Drawing Sheets

METHOD FOR COMPENSATING ALTERNATOR REGULATION TO CONTROL REMOTE BATTERY VOLTAGE UTILIZING ADAPTIVE VARIABLE

PRIORITY CLAIM TO RELATED APPLICATION(S)

This application claims the benefit, under Title 35, U.S.C. §119(e), of U.S. Provisional Patent Application Ser. No. 62/055,560 entitled METHOD FOR COMPENSATING ALTERNATOR REGULATION TO CONTROL REMOTE BATTERY VOLTAGE UTILIZING ADAPTIVE VARIABLE filed Sep. 25, 2014, the entire disclosure of which is expressly incorporated herein by reference.

BACKGROUND

The present disclosure generally relates to systems and methods for generating and distributing electrical power, and more particularly to such systems and methods in which voltage at the remote electrical load is communicated to the generator via a serial communication network.

Typically, a generator is a rotary electric machine of well-known type having a stator surrounding a rotor driven through a belt or shaft by a prime mover (e.g., an engine) to electromagnetically induce electrical current in conductive windings of the stator, whereby mechanical power is converted into electrical power. The stator includes phase coils coupled in a Delta or Wye configuration. A generator may be a DC type that produces direct current or an AC type that produces an alternating current, the latter type also referred to as an alternator.

Where used to charge a battery (or multiple batteries) that powers an electrical system, the alternator output is a rectified DC voltage. The stator is electrically coupled to the rectifier, which delivers the alternator output to the alternator's B+ terminal. The voltage at the alternator B+ terminal is the alternator's controlled voltage setpoint or internal control point voltage, and also referred to herein as $V_{CONTROL}$. The B+ terminal is electrically connected via a cable to the battery, which is the primary component of the alternator load. The voltage drop between the alternator internal control point voltage at the B+ terminal (i.e., $V_{CONTROL}$) and the actual battery voltage, $V_{BAT}$, can change with battery cable resistance, and thus with alternator output current.

Parallel alternator systems, wherein multiple alternators are electrically connected to each other in parallel, may be adapted for use in mobile installations, and may be the primary power source for charging batteries that provide electrical power for various types of vehicles, such as over-the-road tractors or large buses for example. Parallel alternator systems, particularly those used in vehicles, typically employ a single engine to drive the multiplicity of alternators. For example, the single engine of an over-the-road tractor or large bus drives each of a multiplicity of parallel-connected alternators mounted to the engine and driven by the engine crankshaft through one or more belts. The multiple alternators may be identical to each other, and may be driven at a common speed that is a ratio of the engine crankshaft speed. In a parallel alternator system, the entire load is shared by all of the parallel-connected alternator units operating in the system and load sharing between these alternator units is typically done to ensure they all contribute the same power toward the system load, or so that they all share the same voltage setpoint. The individual alternator units operating in parallel systems are typically of smaller capacities, and may be of identical or variable output relative to each other.

Regardless of whether one alternator unit or a plurality of parallel-connected alternator units is utilized by the battery charging system, the output of the stator windings of each alternator unit providing power to the system is normally controlled by either a single voltage regulator common to all alternator units in the system, or a dedicated voltage regulator for that respective alternator unit. Relative to each alternator unit, the alternator regulator (whether common to all alternator units in the system, or dedicated to that alternator unit) is configured to control the excitation current to a field coil carried by the rotor of the alternator unit. The regulator includes a field driver circuit configured to deliver the electric excitation current signal to the rotor field coil at a switching frequency. Although some alternators utilize variable frequency field drivers that provide current pulses to their rotor field coils at varying frequencies, vehicle alternators have traditionally utilized fixed frequency field drivers. In these alternators, a field driver circuit provides pulses of current to the rotor field coil at a fixed frequency. The rotor field coil receives a signal indicative of a predetermined duty cycle from the regulator. The strength of the alternator rotor's moving magnetic field, which induces alternating current flow in the stator windings of the surrounding stator is controlled by the voltage regulator(s). The alternating stator output current is rectified to generate a DC alternator output voltage, which is the alternator voltage setpoint, $V_{CONTROL}$.

In general, when more excitation current is provided by the regulator to the rotor field coil, the output voltage setpoint of the alternator at its B+ terminal increases, and when less excitation current is provided to the rotor field coil, the output voltage setpoint of the alternator decreases. The alternator's DC voltage setpoint at the B+ terminal directly correlates to the rotor field coil excitation current or rotor field duty cycle, which is regulated in response to the electrical load on the alternator. The correlated rotor field excitation current or duty cycle, and alternator load, are commonly expressed as a percentage between 0% and 100%. Thus, the alternator generates an output voltage, $V_{CONTROL}$, having a magnitude based on the duty cycle of the regulated excitation current signal applied to the rotor field coil.

Typically, an alternator has its own dedicated digital microcontroller (the "alternator controller") that controls the operation of the alternator unit and may include both the regulator and the rectifier. The alternator controller may be a plug and play device. In a system of parallel-connected alternators, the alternator controllers of the system's alternators cooperate in the operation of the overall battery charging system, which is controlled by a system controller. Moreover, the plurality of alternator controllers may coordinate among themselves to control the system or designate a system controller that is internal to one alternator. Alternatively, the system controller may be an external electronic control unit ("ECU") in communication with the alternator controllers but located remotely from the alternators.

The regulator's field driver circuit is controlled by the alternator controller and is configured to control the excitation current provided to the rotor field coil. The field driver circuit may include a MOSFET transistor configured to control the electric current delivered to the rotor field coil. The transistor is switchable between an on-state and an off-state at the switching frequency. Transistor switching of each of the parallel-connected alternators or the sole alternator of the charging system, as the case may be, is controlled by a respective alternator controller.

The alternator controller controls the current output of the regulator to the rotor field coil by delivering control signals to the gate of the field driver circuit transistor. These control signals switch the transistor on and off such that the regulator output field voltage is provided to the rotor field coil as a pulse signal to regulate excitation current. The field voltage signal has a pulse duration τ, and a pulse period T at which the pulses repeat. The rotor field duty cycle, $F_{ROTOR}$, is calculated as τ/T. Depending on the inputs received, the alternator controller may adjust its rotor field duty cycle $F_{ROTOR}$ in an attempt to control the alternator output voltage setpoint by increasing or decreasing the pulse duration T of the field voltage signal. The commanded duty cycle of the alternator (i.e., its rotor field duty cycle), which can range between 0% and 100%, thus directly corresponds to the stator output voltage, which is rectified to provide the alternator voltage setpoint ($V_{CONTROL}$) at the alternator B+ terminal as a DC voltage. Thus, the rotor field duty cycle, $F_{ROTOR}$, the rotor excitation current, $I_{ROTOR}$, and the alternator voltage setpoint, $V_{CONTROL}$, directly correspond to each other.

The alternator B+ terminal is connected through a battery cable to the positive terminal of a battery for charging the battery, which is the primary load on the charging system. In the case of a parallel-connected alternator system, the connection between the B+ terminals of the parallel-connected alternators and the battery is through an intermediate voltage bus which is essentially part of the battery cable between each alternator B+ terminal and the battery. When the battery charging system is under load, i.e., when electrical power from the alternator is delivered to the battery, current flows from the alternator B+ terminal through the battery cable. Consequently, voltage losses occur within the battery cable, which can result in voltage drop from the voltage level at the alternator B+ terminal being realized at the battery. The battery cable voltage losses generally increase linearly with alternator load above the alternator's substantially unloaded state (i.e., at the 0% alternator load level), in which no battery cable losses occur.

Some prior battery charging systems and alternators thereof have external remote sensing capabilities, which utilize a small gauge sensing wire external to the alternator and connected to the battery, through which the system reads the actual voltage at the battery, $V_{BAT,COMP}$. The regulator of the remote sensing alternator of this system has an input pin to which the system's external sensing wire is also connected. The alternator regulator receives as an analog signal, and thus senses, the battery voltage $V_{BAT,COMP}$ for use in adjusting the alternator's output voltage setpoint. The adjustments to the alternator's voltage setpoint offset or compensate for voltage losses occurring in the battery cable, and ensures that the battery voltage $V_{BAT,COMP}$ is maintained at a desired level over the range of alternator loads.

In battery charging systems having external remote sensing capabilities, the additional, compensating portion of the output voltage setpoint provided at the alternator's B+ terminal while the alternator is under load forces current into the battery at a relatively faster rate, thereby decreasing the charging time to reach full battery charge. Typically, the regulated adjustments to the alternator voltage setpoint are such as to maintain $V_{BAT,COMP}$ at a constant level equivalent to the alternator's output voltage setpoint at 0% alternator load, $V_{Set0}$.

In FIG. 1, which relates to comparable example 24-volt charging systems, line 20 shows that between 0% and 100% of alternator load, a prior system having external remote sensing capabilities maintains the voltage at the battery, $V_{BAT,COMP}$, at a substantially constant level equal to $V_{Set0}$, which in the examples discussed herein, is 28.3 volts. In the illustrated example, the charging system's external remote sensing capabilities adjust $V_{CONTROL,COMP}$ to offset or compensate the voltage drop that occurs in the battery cable between the alternator B+ terminal and the battery, to maintain the battery voltage, $V_{BAT,COMP}$, at a constant level of 28.3 volts, a voltage equal to the alternator's prescribed $V_{Set0}$ level.

Internally of an alternator used in a charging system having external remote sensing capabilities, the alternator output voltage setpoint at the alternator B+ terminal, $V_{CONTROL,COMP}$, linearly increases with alternator load to compensate for the linearly increasing voltage losses in the battery cable connecting the alternator B+ terminal and the battery, as indicated by line 22 of FIG. 2. $V_{CONTROL,COMP}$ ranges linearly along line 22 from $V_{Set0}$, which is 28.3 volts at 0% alternator load, to 28.5 volts at 100% alternator load. The linearly increasing alternator voltage output $V_{CONTROL,COMP}$ offsets or compensates for the linearly increasing battery cable voltage losses, which range from 0 volts at 0% load to 0.2 volts at 100% load, and maintains battery voltage $V_{BAT,COMP}$ at a constant 28.3 volt level, as indicated by line 20 of FIG. 1. Thus, battery voltage, $V_{BAT,COMP}$, which is continually sensed by the alternator regulator as an analog voltage signal via the external remote sensing wire, is maintained at a constant, desired 28.3 volt level that matches $V_{Set0}$.

In other words, in the example prior 24-volt battery charging system having external remote sensing capabilities, $V_{CONTROL,COMP}$ at 100% alternator load, is 28.5 volts (i.e., $V_{Set0}$+0.2 volts). At less than 100% alternator load, the alternator's internal control point voltage $V_{CONTROL,COMP}$ linearly decays to 28.3 volts, the original $V_{Set0}$ value at 0% alternator load. Referring to FIG. 2, linear scaling of the change in voltage control point $V_{CONTROL,COMP}$ along line 22 to offset or compensate for battery cable voltage losses helps keep the voltage at the battery, $V_{BAT,COMP}$, substantially constant at the 28.3-volt level indicated by line 20 of FIG. 1. Hence, the example prior charging system having external remote sensing capabilities offsets or compensates for the linearly varying battery cable voltage losses over the entire range of alternator loads or duty cycles.

In contradistinction, some other prior battery charging systems altogether lack remote sensing capabilities. Battery charging systems lacking external remote sensing capabilities are, in comparison to those having external remote sensing capabilities, relatively less expensive and entail relatively less wiring complexity, but in such systems battery cable losses are not offset and are uncompensated for. As a result, battery voltage $V_{BAT,UNCOMP}$ linearly decreases with increases in alternator load. As is well-known in the art, alternators used in prior charging systems lacking remote sensing capabilities are often provided with internal voltage sensing and control capabilities through which the alternator output voltage setpoint $V_{CONTROL,UNCOMP}$ at the B+ terminal can be held at a prescribed, constant level over the entire alternator load range. For example, $V_{CONTROL,UNCOMP}$ can be constantly maintained at the alternator's prescribed $V_{Set0}$ level over the entire alternator load range.

As discussed above, battery cable voltage losses linearly increase with increasing alternator load, and in the present example of a charging system lacking remote sensing capabilities, the uncompensated battery voltage $V_{BAT,UNCOMP}$ linearly decreases from 28.3 volts at 0% alternator load, which matches the alternator's prescribed $V_{Set0}$ level, by about 0.2 volts as the alternator load is increased to 100%. The linear drop in the voltage supplied to the battery with increasing current draw through the battery cable is indicated by line 30 of FIG. 1, which shows battery voltage $V_{BAT,UNCOMP}$ decreasing linearly with increasing alternator load, from 28.3 volts (i.e., the $V_{Set0}$ level) at 0% alternator load, to about 28.1 volts at 100% alternator load. Meanwhile, referring to line 32 of FIG. 2, the alternator output voltage setpoint $V_{CONTROL,UNCOMP}$ at the alternator B+ terminal is maintained at its constant $V_{Set0}$ level of 28.3 volts over the entire alternator load range between 0% and 100% in this example.

In other words, because the voltage drop through the battery cable connecting the alternator B+ terminal and the battery increases linearly with alternator output current, in a battery charging system lacking remote sensing capabilities wherein the alternator's output voltage setpoint at the B+ terminal ($V_{CONTROL,UNCOMP}$) is maintained constant at the alternator's $V_{Set0}$ level, and the actual battery voltage $V_{BAT,UNCOMP}$ drops linearly with increasing alternator load. In the present example, referring to line 30 of FIG. 1, at the 0% alternator load level, the alternator's substantially unloaded state at which cable voltage losses are negligible, $V_{BAT,UNCOMP}$ is 28.3 volts, the alternator's prescribed $V_{Set0}$ level. But as battery cable voltage losses increase linearly with alternator load, reduced voltage levels are delivered to the battery. $V_{BAT,UNCOMP}$ drops to 28.1 volts at 100% alternator load, or 0.2 volts below the level of 28.3 volts at the 0% alternator load level, although the alternator's internal voltage sensing and control capabilities maintain $V_{CONTROL,UNCOMP}$ at the B+ terminal constant at the $V_{Set0}$ level of 28.3 volts over the entire range of alternator loads. Thus, while charging systems altogether lacking remote sensing capabilities provide relatively lower cost and complexity than prior battery charging systems having external remote sensing capabilities, the latter system type provides relatively better charging performance.

Modern vehicles typically include a controller area network ("CAN") through which different ECUs for various subsystems send and receive messages to, for example, control subsystem operations or receive feedback from sensors. The ECUs form nodes which serially communicate through the CAN bus. Each node is able to send and receive messages, but not simultaneously, and the serial communication of the messages is on a priority basis. While there may be no delay to higher priority messages which are immediately retransmitted, the refresh rate for lower priority messages can be as long as one to three seconds.

In some modern vehicles having a CAN, information identifying the sensed battery voltage level $V_{BAT}$ is already communicated on the CAN bus. If such a vehicle's battery charging system also has external remote sensing capabilities, it is often seen as cost-advantageous to omit the alternator regulator's analog signal receiving input pin and the dedicated external remote sensing wire connecting the input pin and the positive terminal of the battery, and replace the alternator controller with one receivable of the serially communicated information identifying the battery voltage level $V_{BAT}$. Thus, serial communication to an alternator controller of battery voltage information over a vehicle CAN may facilitate some ability to provide the alternator regulator and/or alternator controller (hereinafter the alternator regulator/controller) with remote battery voltage sensing signals for use in regulating alternator output, and avoid at least some of the costs and wiring complexity associated with a battery charging system having external remote sensing capabilities.

However, depending on messaging priority levels, serial communication speeds, and CAN bus loading, it may not be possible to send a signal indicative of the sensed battery voltage over the CAN bus at a rate fast enough for the alternator regulator/controller to efficiently regulate the alternator output voltage setpoint. In other words, the vehicle's serial communication protocol may be too slow to adequately provide data through the battery charging system control loop to maintain voltage supplied to the battery at a desired level, such as, for example, the constant $V_{BAT,COMP}$ level provided by the prior system having external remote sensing capabilities indicated by line 20 in FIG. 1. Additional issues with relying on serial communication over the CAN bus to maintain battery voltage at a desired, constant level arise when the vehicle serial communications are set up to communicate the constant voltage level desired at the battery (e.g., 28.3 volts in the present example), but not the compensating voltage adjustments to $V_{CONTROL}$ by which the varying battery cable losses between the alternator B+ terminal and the battery are offset. Heretofore, the performance of prior external remote sensing systems has not been conveniently and inexpensively matched by utilizing $V_{BAT}$ information serially communicated over the vehicle CAN bus to the alternator regulator/controller.

Although analog inputs could be implemented to serially communicate the battery voltage signal(s) to an analog input of the alternator regulator for monitoring the battery voltage, such an arrangement would undesirably increase wiring complexity and charging system costs. On the other hand, heretofore, relying on serial communications to achieve any real-time feedback of sensed battery voltage to the alternator regulator/controller without providing external remote sensing capabilities requires providing faster, more expensive serial communication networks, or assigning higher messaging priority to battery voltage information, neither of which is desirable. A method or system for achieving the performance levels associated with external remote sensing capabilities in a battery charging system, without providing the external remote sensing capabilities themselves or a relatively more expensive and/or faster serial communication network, or assigning higher serial communication messaging priority to sensed battery voltage information, is desirable.

SUMMARY

The present disclosure provides a method for regulating the alternator output voltage setpoint in a battery charging system lacking external remote sensing capabilities, utilizing serial communications, a controller, and an adaptive variable, to extrapolate the battery cable voltage loss changes occurring with changes in alternator load, and accordingly adjust the alternator output voltage setpoint ($V_{CONTROL}$) at the alternator B+ terminal to offset or compensate for battery cable losses.

A method according to the present disclosure utilizes, in a battery charging system lacking external remote voltage sensing capabilities, a serial communication message to adjust the alternator's internally sensed voltage setpoint to offset or compensate for battery cable voltage losses between the alternator's B+ terminal and the battery whose voltage information is serially communicated to the alternator regulator/controller.

A method according to the present disclosure is applicable to a battery charging system utilizing either a single alternator or a plurality of parallel-connected alternators, and provides battery charging system performance matching or superior to that of prior charging systems having external remote sensing capabilities, without requiring the remote sensing wire or the alternator's associated analog signal input to the regulator, a relatively more expensive and/or faster serial communication network, or assigning higher priority to serially communicated messages providing sensed battery voltage information.

The present disclosure provides a method for regulating the output voltage setpoint ($V_{CONTROL,ADAPT}$) of an alternator, including the steps of: establishing a first voltage setpoint of the alternator corresponding to a first alternator load level ($V_{Set0}$) and an initial value ($V_{100, INIT}$) for a second voltage setpoint of the alternator corresponding to a second alternator load level ($V_{100}$) greater than the first load level; serially communicating information identifying the voltage level of a battery ($V_{BAT,ADAPT}$) charged by the alternator through a battery cable continually to a controller; using the controller to incrementally increase the second voltage setpoint ($V_{100}$) from its initial value ($V_{100,INIT}$) until a desired relationship is reached between the battery voltage ($V_{BAT,ADAPT}$) and the first voltage setpoint ($V_{Set0}$), and to then define an end value ($V_{100,END}$) for the second voltage setpoint ($V_{100}$); using the controller to determine an adaptive variable ($R_{ADAPT}$) based on the first voltage setpoint ($V_{Set0}$) and the defined end value ($V_{100,END}$) for the second voltage setpoint ($V_{100}$), and to determine, utilizing the adaptive variable ($R_{ADAPT}$), offsetting levels of the alternator output voltage setpoint ($V_{CONTROL,ADAPT}$) that compensate for battery cable voltage losses estimated to occur over a range of alternator load levels between the first and second alternator load levels; and continually regulating the alternator output voltage setpoint ($V_{CONTROL,ADAPT}$) to an offsetting level that compensates for the respective battery cable voltage drop between the alternator and the battery and maintain the battery voltage ($V_{BAT,ADAPT}$) at a substantially constant level.

The present disclosure also provides a method for regulating the output voltage setpoint of an alternator, including the steps of: establishing a first output voltage setpoint corresponding to a 0% alternator load level ($V_{Set}$) and an initial value ($V_{100,INIT}$) for a second output voltage setpoint corresponding to a 100% alternator load level ($V_{100}$); serially communicating information regarding the voltage level of a battery ($V_{BAT,ADAPT}$) charged by the alternator through a battery cable continually to a controller; using the controller to incrementally increase the second output voltage setpoint level ($V_{100}$) from its initial value ($V_{100,INIT}$) until the serially communicated battery voltage level ($V_{BAT,ADAPT}$) is substantially equal to the first output voltage setpoint level ($V_{Set0}$), and to then define an end value ($V_{100,END}$) for the second output voltage setpoint level ($V_{100}$); using the alternator controller to determine an adaptive variable ($R_{ADAPT}$) based on the first output voltage setpoint level ($V_{Set0}$) and the defined end value ($V_{100,END}$) for the second output voltage setpoint level ($V_{100}$), and to determine the offsetting level of alternator output voltage setpoint ($V_{CONTROL,ADAPT}$) that compensates for the battery cable voltage drop relative to the first output voltage setpoint level ($V_{Set0}$) at a respective alternator load level in a range between the 0% and 100% alternator load levels; and regulating the alternator output voltage setpoint ($V_{CONTROL,ADAPT}$) to its offsetting level to maintain the battery voltage ($V_{BAT,ADAPT}$) at a substantially constant value equivalent to the first output voltage setpoint level ($V_{Set0}$).

BRIEF DESCRIPTION OF THE DRAWINGS

The above-mentioned aspects and other characteristics and advantages of a method and/or system according to the present disclosure will become more apparent and will be better understood by reference to the following description of exemplary embodiments taken in conjunction with the accompanying drawings, wherein.

DETAILED DESCRIPTION OF EXEMPLARY EMBODIMENT(S)

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
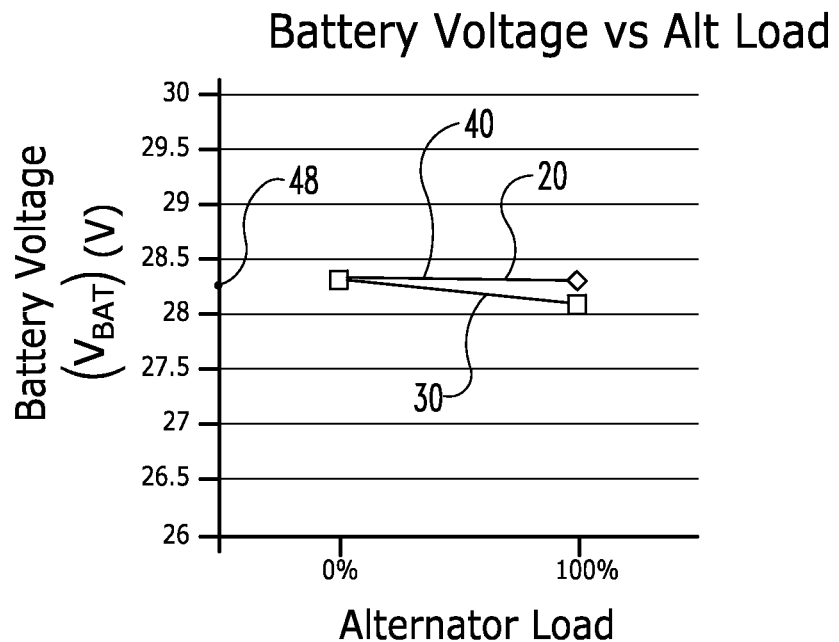
FIG. 1 is a graph showing the voltage delivered to the battery ($V_{BAT}$), between 0% and 100% alternator load (or rotor field duty cycle), of three different 24-volt battery charging systems respectively associated with battery voltages $V_{BAT,COMP}$ and $V_{BAT,UNCOMP}$ according to the prior art, and $V_{BAT,ADAPT}$ according to the present disclosure.

FIG. 1 is a graph showing the voltage delivered to the battery ($V_{BAT}$), between 0% and 100% alternator load (or rotor field duty cycle), of three different 24-volt battery charging systems respectively associated with battery voltages $V_{BAT,COMP}$ and $V_{BAT,UNCOMP}$ described above, and $V_{BAT,ADAPT}$ described below The prior battery charging system corresponding to the constant battery voltage indicated by line 20 of FIG. 1 ($V_{BAT,COMP}$) has external remote sensing capabilities that offset or compensate for the battery cable voltage losses between the alternator B+ terminal and the battery. Such a system provides the actual battery voltage level as an analog signal to the alternator regulator via a remote sensing wire.

The prior battery charging system corresponding to the linearly varying battery voltage indicated by line 30 of FIG. 1 ($V_{BAT,UNCOMP}$) altogether lacks compensation for a cable voltage drop between the alternator B+ terminal and the battery. As is typical of such a system, in the present example the alternator includes internal voltage sensing and control capabilities through which the alternator output voltage setpoint $V_{CONTROL,UNCOMP}$ at the B+ terminal is held constant at a prescribed $V_{Set0}$ level over the entire alternator load range.

A battery charging system corresponding to the constant battery voltage indicated by line 40 of FIG. 1 ($V_{BAT,ADAPT}$) employs a method according to the present disclosure. This method and system utilize serial communications and an adaptive variable to offset or compensate for the battery cable voltage losses between the alternator B+ terminal and the battery, and in the present example substantially matches the charging performance of the above mentioned system having external remote sensing capabilities, which yields curve $V_{BAT,COMP}$. In FIG. 1 line 40 ($V_{BAT,ADAPT}$) substantially coincides with line 20 ($V_{BAT,COMP}$).

Figure 2:
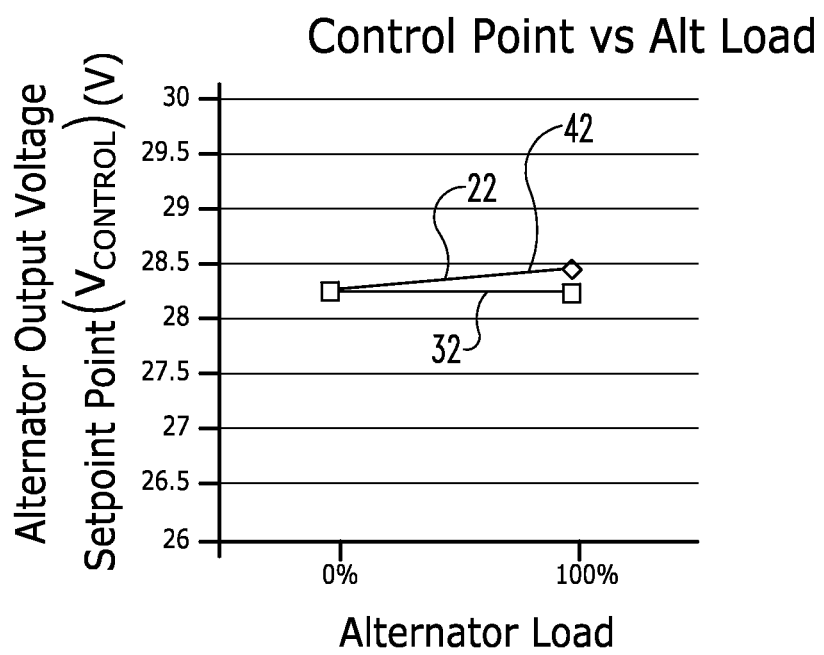
FIG. 2 is a graph showing the alternator output voltage setpoints at the alternator's B+ terminal ($V_{CONTROL}$), between 0% and 100% alternator load (or rotor field duty cycle), of the three battery charging systems indicated in FIG. 1, which are respectively associated with $V_{CONTROL,COMP}$ and $V_{CONTROL,UNCOMP}$ according to the prior art, and $V_{CONTROL,ADAPT}$ according to the present disclosure.

FIG. 2 correlates with FIG. 1, and is a graph showing the alternator output voltage setpoints (or internal voltage control points) at the alternator B+ terminal (i.e., $V_{CONTROL}$), between 0% and 100% alternator load (or rotor field duty cycle), of the three above-mentioned battery charging systems respectively associated with $V_{CONTROL,COMP}$ and $V_{CONTROL,UNCOMP}$ discussed above, and $V_{CONTROL,ADAPT}$ discussed below.

The prior battery charging system yielding curve $V_{BAT,COMP}$ of FIG. 1, yields the linearly varying control point voltages indicated by line 22 of FIG. 2 ($V_{CONTROL,COMP}$). The prior battery charging system yielding curve $V_{BAT,UNCOMP}$ of FIG. 1, yields the constant, level control point voltage indicated by line 32 of FIG. 2 ($V_{CONTROL,UNCOMP}$). The battery charging system yielding curve $V_{BAT,ADAPT}$ of FIG. 1, yields the linearly varying control point voltages indicated by line 42 of FIG. 2 ($V_{CONTROL,ADAPT}$), which substantially coincides with line 22 ($V_{CONTROL,COMP}$).

A battery charging method or system utilizing serial communications according to the present disclosure may be readily accommodated in a CAN-equipped vehicle, and can match or exceed the performance of prior battery charging systems having external remote sensing capabilities by similarly providing a constant desired voltage level at the battery (see FIG. 1), and at relatively lower cost and wiring complexity. This is achieved by using a controller receivable of sensed battery voltage information that is serially communicated, to linearly scale alternator output voltage setpoint changes between 0% and 100% of alternator load (see FIG. 2), without requiring prior external remote sensing capabilities, relatively faster or more expensive serial communication networks, or assigning higher priority to serially communicated messages regarding battery voltage level information.

Referring to FIG. 2, in an exemplary 24-volt battery charging system embodiment according to the present disclosure, $V_{CONTROL,ADAPT}$ at 100% alternator load is 28.5 volts (i.e., $V_{Set0}$+0.2 volts). At less than the 100% alternator load, the alternator's output voltage setpoint, or internal control point voltage, $V_{CONTROL,ADAPT}$ linearly decays along line 42 towards the original $V_{Set0}$ value at 0% alternator load (which is 28.3 volts in this example). Linear scaling of the change in voltage control point $V_{CONTROL,ADAPT}$ along line 42 to offset or compensate for battery cable voltage losses encountered over the range of alternator loads helps keep the voltage at the battery, $V_{BAT,ADAPT}$ substantially constant at the 28.3 volt, $V_{Set0}$, level indicated by line 40 of FIG. 1, matching the performance of the example prior battery charging system having external remote sensing capabilities, which is indicated by the $V_{BAT,COMP}$ curve, line 20, of FIG. 1. Thus, a method or system according to the present disclosure beneficially provides charging system performance previously realized by a comparable battery charging system having external remote sensing capabilities, without the added expense and wiring complexity of actually providing remote sensing, and can be achieved utilizing serial communications capability and messaging priority levels already provided by a typical vehicle CAN.

Figure 3:
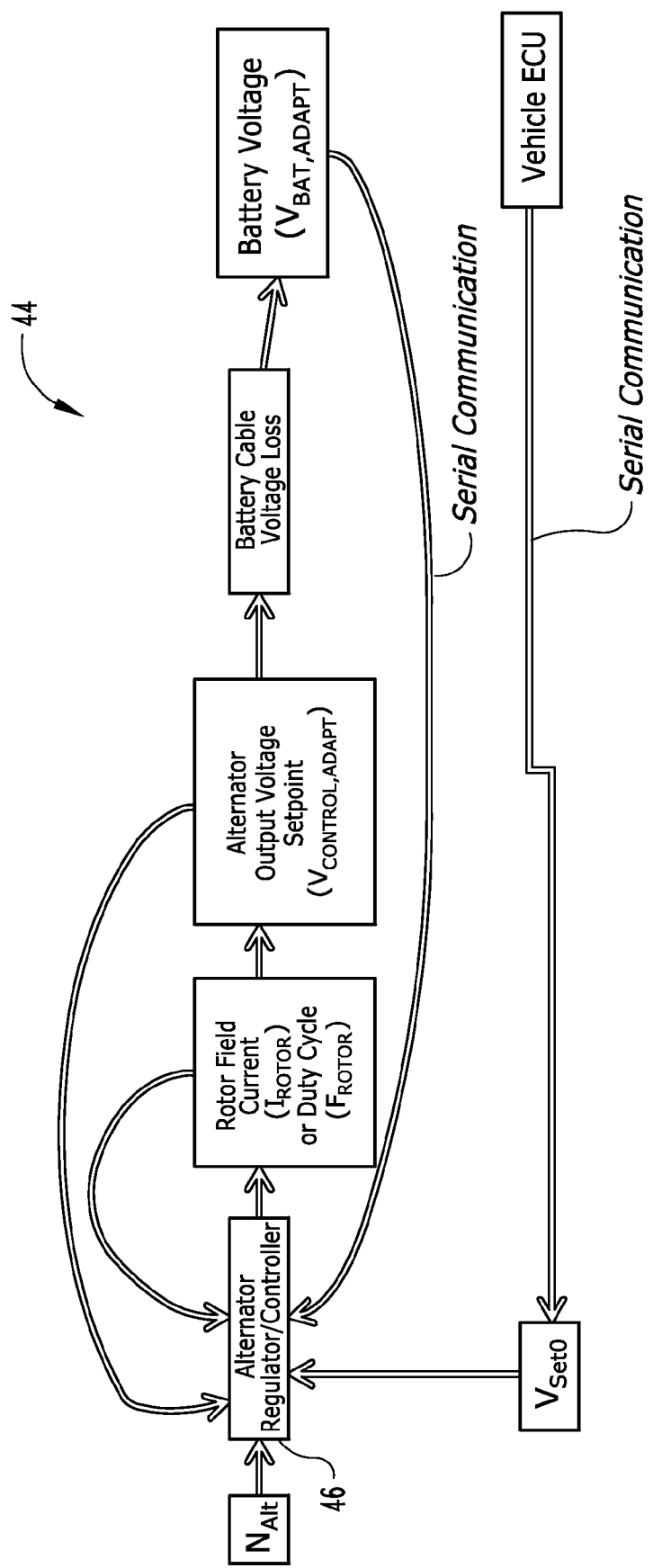
FIG. 3 is a schematic showing information transmitted, partially through a serial communication network such as a vehicle CAN, according to a first battery charging system or method embodiment according to the present disclosure.

Serial communication between nodes of a vehicle CAN in a first embodiment battery charging system 44 according to the present disclosure is indicated in FIG. 3. As shown, the alternator regulator/controller 46 of the sole alternator, or of each of a plurality of parallel-connected alternators, as the case may be, is a node on the CAN, and receives a message providing the sensed, actual battery voltage, $V_{BAT,ADAPT}$, which is continuously monitored and serially communicated over the CAN bus to the alternator regulator/controller 46.

In conjunction with the communication flow shown FIG. 3, a first embodiment of a method according to the present disclosure proceeds by establishing $V_{Set0}$, the desired output voltage setpoint for 0% alternator loading (and for 0% rotor field duty cycle). $V_{Set0}$ can be established or prescribed either as a fixed, default value or an initialization value previously determined to represent the desired alternator output voltage setpoint. $V_{Set0}$ is established by a vehicle electronics control unit (ECU), is serially communicated to the alternator regulator/controller 46, and is the battery voltage level desired to be held constant regardless of alternator load, as indicated by the $V_{BAT,ADAPT}$ voltage level at point 48 of FIG. 1, which in the present example is 28.3 volts. Referring to FIG. 2, in the present example the $V_{CONTROL,ADAPT}$ curve (line 42) desirably coincides with the $V_{CONTROL,COMP}$ curve (line 22).

Once the alternator is under load and producing current output, alternator regulator/controller 46 may determine that the received, serially communicated sensed value of $V_{BAT,ADAPT}$ (or its filtered average) is less than the established $V_{Set0}$ value. Such a condition temporarily reflects the on-going operating condition of a comparable prior charging system lacking remote sensing capabilities, for $V_{BAT,UNCOMP}$ (line 30 of FIG. 1) is always less than $V_{CONTROL,UNCOMP}$ (line 32 of FIG. 2) other than at 0% alternator load. If such a determination is made, alternator regulator/controller 46 will then incrementally increase the alternator's internally sensed voltage control point $V_{100}$, which is the alternator's output voltage setpoint at the B+ terminal at the recognized 100% alternator load, starting at its present, internally sensed initial value, $V_{100,INIT}$.

The incremental increases to the $V_{100}$ setpoint are of a predefined amount, and can be small, e.g., as little as 0.01 to 0.1 volts, and may be made at a rate corresponding to the rate at which information identifying battery voltage level $V_{BAT,ADAPT}$ is serially communicated over the CAN bus. The voltage increments made to $V_{100}$ continue until the serially communicated $V_{BAT,ADAPT}$ level (or its filtered average) reaches the level of $V_{Set0}$, at which point an end value for $V_{100}$, $V_{100,END}$, is defined by adding the total of the increments to the internal output voltage setpoint to $V_{Set0}$. A ratio, $R_{ADAPT}$, the above-mentioned adaptive variable, is then established:

$$R_{ADAPT}=(V_{100,END}-V_{Set0})/V_{Set0} \quad (1)$$

It is known by those having ordinary skill in the relevant art that the total electrical load on the alternator(s) as a percentage of the maximum charging system capacity, $Alt_{LOAD\%}$, can be represented by the rotor field coil excitation current(s), $I_{ROTOR}$, and the speed of the alternator(s) in the system, $N_{Alt}$. Thus:

$$Alt_{LOAD\%}=f(I_{ROTOR}, N_{Alt}) \quad (2a)$$

It is likewise known by those having ordinary skill in the relevant art that the total electrical load on the alternator(s) as a percentage of the maximum charging system capacity, Alt$_{load\%}$, can be alternatively represented by the rotor field duty cycle(s), F$_{ROTOR}$, and the speed of the alternator(s) in the system, N$_{Alt}$. Thus:

$$Alt_{LOAD\%}=f(F_{ROTOR}, N_{Alt}) \quad (2b)$$

The internal alternator control point V$_{CONTROL,ADAPT}$ at the alternator B+ terminal, between 0% and 100% percent alternator load (or rotor field duty cycle), which offsets or compensates for the battery cable voltage losses, can be estimated as:

$$V_{CONTROL,ADAPT}=V_{Set0}*(1+(Alt_{LOAD\%}*R_{ADAPT})) \quad (3)$$

The alternator controller's utilization of the adaptive variable, R$_{ADAPT}$, facilitates a linear extrapolation in either direction along line 42 of FIG. 2 to increase or decrease the internal alternator control point voltage V$_{CONTROL,ADAPT}$ realized at the alternator B+ terminal. The method and system of the first embodiment thereby provides a constant voltage level V$_{BAT,ADAPT}$ at the battery, indicated at point 48 of FIG. 1, that is equivalent to the established V$_{Set0}$ level. Referring to FIG. 2, in the present example the value of V$_{CONTROL,ADAPT}$ between 0% and 100% alternator load can thus be linearly regulated along line 42 between the established V$_{Set0}$ value of 28.3 volts and a desired 28.5 volts at 100% alternator load to compensate for battery cable voltage losses. Alternator loads exceeding the recognized 100% level indicated in FIGS. 1 and 2 may be accommodated by further, commensurate increases in alternator output voltage setpoint along line 42, until the maximum alternator current output of the system is reached.

Figure 4:
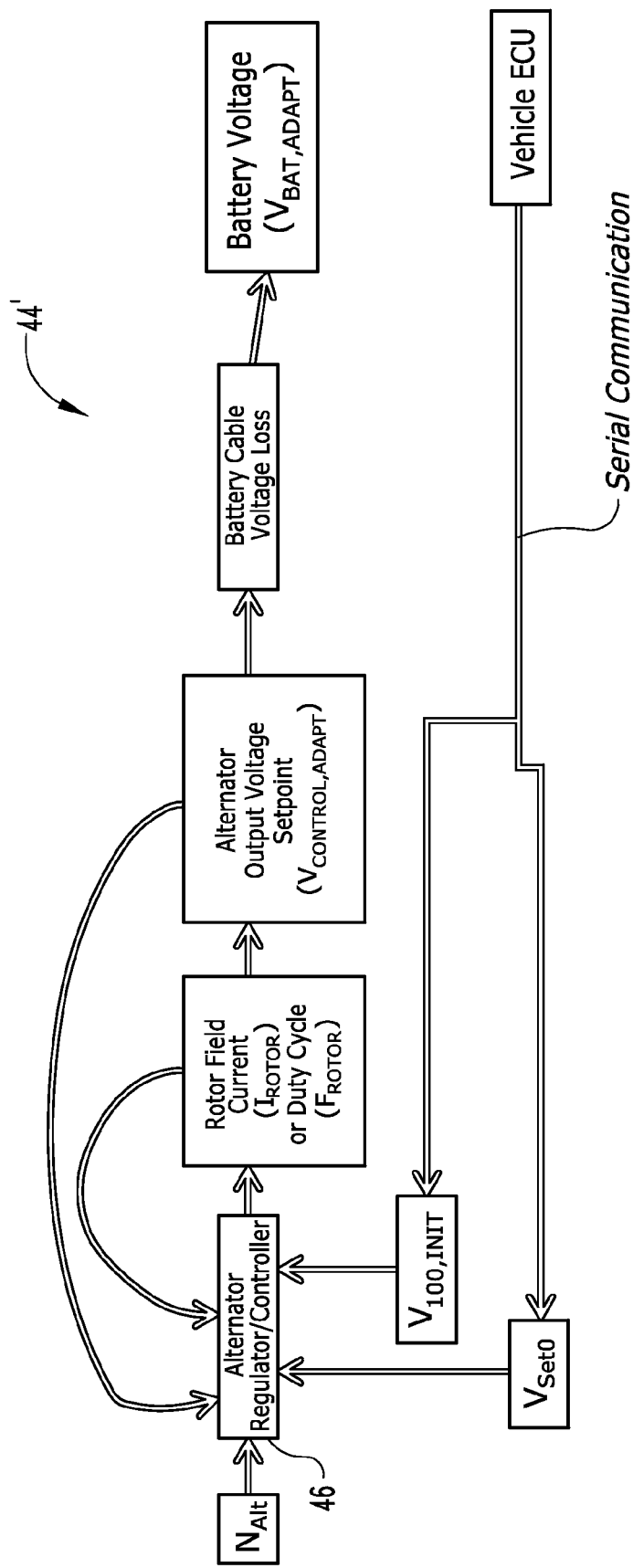
FIG. 4 is a schematic showing information transmitted, partially through a serial communication network such as a vehicle CAN, according to an alternative, second battery charging system or method embodiment according to the present disclosure.

A second, alternative embodiment of a method and charging system 44' according to the present disclosure provides serial communication between CAN nodes as indicated in FIG. 4. The second embodiment is substantially identical to the above-described first embodiment, except as follows:

In the second embodiment, monitored battery voltage V$_{BAT,ADAPT}$ is serially communicated to the vehicle ECU, and V$_{Set0}$ and V$_{100INIT}$ are established by and/or serially communicated from the vehicle ECU to the alternator regulator/controller 46.

In the second embodiment, once the alternator is producing output, if the vehicle ECU determines that the sensed value of V$_{BAT,ADAPT}$ serially communicated to the ECU is less than the established value (e.g., a default value or serially communicated initialization value) of V$_{Set0}$, then V$_{100}$ is incrementally increased, starting from its established initial value, V$_{100,INIT}$, by a predefined amount (e.g., 0.1 volt) until the sensed value of V$_{BAT,ADAPT}$ (or its filtered average), serially communicated to the ECU, reaches V$_{Set0}$. In other respects, the first and second method and system embodiments are substantially identical functionally and structurally.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for regulating the output voltage setpoint (V$_{CONTROL,ADAPT}$) of an alternator, comprising the steps of: establishing a first voltage setpoint of the alternator corresponding to a first alternator load level (V$_{Set0}$) and an initial value (V$_{100,INIT}$) for a second voltage setpoint of the alternator corresponding to a second alternator load level (V$_{100}$) greater than the first load level;

serially communicating information identifying the voltage level of a battery (V$_{BAT,ADAPT}$) charged by the alternator through a battery cable continually to a controller;

using the controller to incrementally increase the second voltage setpoint (V$_{100}$) from its initial value (V$_{100,INIT}$) until a desired relationship is reached between the battery voltage (V$_{BAT,ADAPT}$) and the first voltage setpoint (V$_{Set0}$), and to then define an end value (V$_{100,END}$) for the second voltage setpoint (V$_{100}$);

using the controller to determine an adaptive variable (R$_{ADAPT}$) based on the first voltage setpoint (V$_{Set0}$) and the defined end value (V$_{100,END}$) for the second voltage setpoint (V$_{100}$), and to determine, utilizing the adaptive variable (R$_{ADAPT}$), offsetting levels of the alternator output voltage setpoint (V$_{CONTROL,ADAPT}$) that compensate for battery cable voltage losses estimated to occur over a range of alternator load levels between the first and second alternator load levels; and continually regulating the alternator output voltage setpoint (V$_{CONTROL,ADAPT}$) to an offsetting level that compensates for the respective battery cable voltage drop between the alternator and the battery and maintain the battery voltage (V$_{BAT,ADAPT}$) at a substantially constant level.

2. The method of claim 1, wherein the determined offsetting levels of the alternator output voltage setpoint (V$_{CONTROL,ADAPT}$) linearly increase with alternator load level.

3. The method of claim 1, wherein the alternator output voltage setpoint (V$_{CONTROL,ADAPT}$) is continually regulated to maintain the battery voltage (V$_{BAT,ADAPT}$) at a value substantially equivalent to the first voltage setpoint (V$_{Set0}$).

4. The method of claim 1, further comprising using the controller to determine, utilizing the adaptive variable (R$_{ADAPT}$), offsetting levels of the alternator output voltage setpoint (V$_{CONTROL,ADAPT}$) that compensate for battery cable voltage losses estimated to occur at alternator load levels greater than the second alternator load level.

5. The method of claim 1, wherein the alternator is one of a plurality of parallel-connected alternators included in a parallel alternator system, wherein each alternator is connected to a voltage bus intermediate the alternator and the battery, and wherein the voltage bus is part of the battery cable through which the battery is charged by the alternator.

6. The method of claim 5, wherein the controller is a system controller, and further comprising regulating the alternator output voltage setpoint (V$_{CONTROL,ADAPT}$) of each alternator with an alternator controller in communication with the system controller.

7. The method of claim 6, wherein at least one of the first voltage setpoint (V$_{Set0}$) and the initial value (V$_{100,INIT}$) for the second voltage setpoint is established by the system controller.

8. The method of claim 6, wherein the system controller is a vehicle ECU.

9. The method of claim 1, wherein the established first voltage setpoint (V$_{Set0}$) is serially communicated to the controller.

10. The method of claim 1, wherein information identifying the voltage level of a battery (V$_{BAT,ADAPT}$) is serially communicated to the controller from a vehicle ECU.

11. The method of claim 1, wherein the controller is a digital alternator controller dedicated to controlling the operation of the alternator.

12. The method claim 11, wherein the alternator controller comprises a voltage regulator and/or rectifier of the alternator.

13. The method of claim 11, wherein the second alternator load level is a recognized 100% alternator load level.

14. The method of claim 1, wherein the first alternator load level is a substantially unloaded state of the alternator.

15. The method of claim 1, wherein the incremental voltage increases to the second voltage setpoint ($V_{100}$) are made at a rate substantially corresponding to the rate at which information identifying the voltage level of a battery ($V_{BAT,ADAPT}$) is serially communicated.

16. The method of claim 1, wherein the desired relationship between the battery voltage ($V_{BAT,ADAPT}$) and the first voltage setpoint ($V_{Set0}$) is substantially equivalence therebetween.

17. A method for regulating the output voltage setpoint of an alternator, comprising the steps of:
  establishing a first output voltage setpoint corresponding to a 0% alternator load level ($V_{Set0}$) and an initial value ($V_{100,INIT}$) for a second output voltage setpoint corresponding to a 100% alternator load level ($V_{100}$);
  serially communicating information regarding the voltage level of a battery ($V_{BAT,ADAPT}$) charged by the alternator through a battery cable continually to a controller;
  using the controller to incrementally increase the second output voltage setpoint level ($V_{100}$) from its initial value ($V_{100,INIT}$) until the serially communicated battery voltage level ($V_{BAT,ADAPT}$) is substantially equal to the first output voltage setpoint level ($V_{Set0}$), and to then define an end value ($V_{100,END}$) for the second output voltage setpoint level ($V_{100}$);
  using the alternator controller to determine an adaptive variable ($R_{ADAPT}$) based on the first output voltage setpoint level ($V_{Set0}$) and the defined end value ($V_{100,END}$) for the second output voltage setpoint level ($V_{100}$), and to determine the offsetting level of alternator output voltage setpoint ($V_{CONTROL,ADAPT}$) that compensates for the battery cable voltage drop relative to the first output voltage setpoint level ($V_{Set0}$) at a respective alternator load level in a range between the 0% and 100% alternator load levels; and
  regulating the alternator output voltage setpoint ($V_{CONTROL,ADAPT}$) to its offsetting level to maintain the battery voltage ($V_{BAT,ADAPT}$) at a substantially constant value equivalent to the first output voltage setpoint level ($V_{Set0}$).

18. The method of claim 17, wherein the offsetting levels of the alternator output voltage setpoint ($V_{CONTROL,ADAPT}$) increase linearly with alternator load above the 0% alternator load level.

19. The method of claim 17, wherein the alternator is one of a plurality of parallel-connected alternators included in a parallel alternator system, wherein each alternator is connected to a voltage bus intermediate the alternator and the battery, and wherein the voltage bus is part of the battery cable through which the battery is charged by the alternator.

20. The method of claim 17, wherein the incremental voltage increases to the second output voltage setpoint level ($V_{100}$) are made at a rate substantially corresponding to the rate at which information identifying the voltage level of a battery ($V_{BAT,ADAPT}$) is serially communicated.

* * * * *